United States Patent
Lipsio, Jr. et al.

(10) Patent No.: US 10,402,221 B2
(45) Date of Patent: *Sep. 3, 2019

(54) PREEMPTIVE OPERATING SYSTEM WITHOUT CONTEXT SWITCHING

(71) Applicant: TYCO FIRE & SECURITY GMBH, Neuhausen am Rheinfall (CH)

(72) Inventors: Vincent J. Lipsio, Jr., Gainesville, FL (US); Paul B. Rasband, Fremont, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 76 days.

This patent is subject to a terminal disclaimer.

(21) Appl. No.: 15/856,223

(22) Filed: Dec. 28, 2017

(65) Prior Publication Data

US 2018/0136969 A1   May 17, 2018

Related U.S. Application Data

(63) Continuation of application No. 15/007,383, filed on Jan. 27, 2016, now Pat. No. 9,910,701, which is a
(Continued)

(51) Int. Cl.
*G06F 9/48* (2006.01)
*G06F 9/46* (2006.01)

(52) U.S. Cl.
CPC .......... *G06F 9/4812* (2013.01); *G06F 9/461* (2013.01); *G06F 9/4843* (2013.01); *G06F 9/4881* (2013.01)

(58) Field of Classification Search
CPC .................................................. G06F 9/4812
(Continued)

(56) References Cited

U.S. PATENT DOCUMENTS 5,414,812 A   5/1995  Filip et al.
5,613,114 A * 3/1997  Anderson ............... G06F 9/461
                                                 718/108
(Continued)

FOREIGN PATENT DOCUMENTS

CN    203057531       7/2013
KR    20100078977 A   7/2010
(Continued)

OTHER PUBLICATIONS

Echague, Juan, Ismael Ripoll, and Alfons Crespo. "Hard real-time preemptively scheduling with high context switch cost." Proceedings Seventh Euromicro Workshop on Real-Time Systems. IEEE, 1995.pp. 184-190 (Year: 1995).*
(Continued)

*Primary Examiner* — Satish Rampuria
(74) *Attorney, Agent, or Firm* — Arent Fox LLP

(57) ABSTRACT

A device, such as a constrained device that includes a processing device and memory, schedules user-defined independently executable functions to execute from a single stack common to all user-defined independently executable functions according to availability and priority of the user-defined independently executable functions relative to other user-defined independently executable functions and preempts currently running user-defined independently executable function by placing the particular user-defined independently executable function on a single stack that has register values for the currently running user-defined independently executable function.

15 Claims, 14 Drawing Sheets

Related U.S. Application Data continuation of application No. 14/585,353, filed on Dec. 30, 2014, now Pat. No. 9,280,389.

(58) Field of Classification Search
USPC .................................................. 718/101–108
See application file for complete search history.

(56) References Cited

U.S. PATENT DOCUMENTS

| | | | |
|---|---|---|---|
| 6,134,634 A * | 10/2000 | Marshall, Jr. | G06F 12/0804 711/141 |
| 6,272,621 B1 | 8/2001 | Key et al. | |
| 6,766,515 B1 * | 7/2004 | Bitar | G06F 9/4843 712/228 |
| 7,176,808 B1 | 2/2007 | Broad et al. | |
| 7,472,230 B2 * | 12/2008 | Prabhu | G06F 12/0804 711/143 |
| 7,688,808 B2 | 3/2010 | Ren et al. | |
| 7,836,450 B2 * | 11/2010 | Kissell | G06F 9/3851 710/260 |
| 7,966,660 B2 | 6/2011 | Yermal et al. | |
| 8,020,160 B2 * | 9/2011 | McKenney | G06F 9/544 707/704 |
| 8,572,290 B1 | 10/2013 | Mukhopadhyay et al. | |
| 8,739,176 B1 | 5/2014 | Darling | |
| 9,032,404 B2 * | 5/2015 | Kissell | G06F 8/4442 718/100 |
| 9,037,152 B1 | 5/2015 | Herrera | |
| 2002/0057204 A1 | 5/2002 | Bligh | |
| 2003/0187612 A1 | 10/2003 | Miyake | |
| 2004/0090329 A1 | 5/2004 | Hitt | |
| 2004/0109059 A1 | 6/2004 | Kawakita | |
| 2005/0143133 A1 | 6/2005 | Bridgelall | |
| 2006/0022816 A1 | 2/2006 | Yukawa | |
| 2006/0039356 A1 | 2/2006 | Rao et al. | |
| 2007/0011683 A1 | 1/2007 | Helander | |
| 2007/0058634 A1 | 3/2007 | Gupta et al. | |
| 2007/0112943 A1 | 5/2007 | Fisher et al. | |
| 2007/0130589 A1 | 6/2007 | Davis et al. | |
| 2007/0239350 A1 | 10/2007 | Zumsteg et al. | |
| 2007/0248065 A1 | 10/2007 | Banerjea et al. | |
| 2008/0002599 A1 | 1/2008 | Yau et al. | |
| 2008/0056261 A1 | 3/2008 | Osborn et al. | |
| 2008/0068267 A1 | 3/2008 | Huseth | |
| 2008/0144587 A1 | 6/2008 | Gupta et al. | |
| 2008/0204267 A1 | 8/2008 | Luterotti et al. | |
| 2009/0021634 A1 | 1/2009 | Chang | |
| 2009/0222921 A1 | 9/2009 | Mukhopadhyay et al. | |
| 2010/0019901 A1 | 1/2010 | Tsai | |
| 2010/0061272 A1 | 3/2010 | Veillette | |
| 2010/0226342 A1 | 9/2010 | Colling et al. | |
| 2011/0051656 A1 | 3/2011 | Hethuin et al. | |
| 2011/0310791 A1 | 12/2011 | Prakash et al. | |
| 2012/0039235 A1 | 2/2012 | Chen et al. | |
| 2012/0082062 A1 | 4/2012 | McCormack | |
| 2012/0092183 A1 | 4/2012 | Corbett et al. | |
| 2012/0124367 A1 | 5/2012 | Ota et al. | |
| 2013/0003645 A1 | 1/2013 | Shapira et al. | |
| 2013/0055282 A1 | 2/2013 | Yi | |
| 2013/0064233 A1 | 3/2013 | Hethuin et al. | |
| 2013/0086195 A1 | 4/2013 | Hiniker | |
| 2013/0239192 A1 | 9/2013 | Linga et al. | |
| 2013/0336230 A1 | 12/2013 | Zou et al. | |
| 2014/0052832 A1 | 2/2014 | Dina et al. | |
| 2015/0248297 A1 | 9/2015 | Rasband et al. | |
| 2015/0248299 A1 | 9/2015 | Rasband et al. | |

FOREIGN PATENT DOCUMENTS

| | | |
|---|---|---|
| WO | WO01/06401 | 1/2001 |
| WO | WO2004/068855 | 8/2004 |
| WO | WO2013/159217 | 10/2013 |

OTHER PUBLICATIONS

Le Moigne, Rocco, Olivier Pasquier, and J-P. Calvez. "A generic RTOS model for real-time systems simulation with SystemC." Proceedings Design, Automation and Test in Europe Conference and Exhibition. vol. 3. IEEE, 2004.pp. 1-6 (Year: 2004).*

Bertogna, Marko, et al. "Optimal selection of preemption points to minimize preemption overhead." 2011 23rd Euromicro Conference on Real-Time Systems. IEEE, 2011.pp. 217-227 (Year: 2011).*

Supplementary Search Report for European Application No. 15876227.8, dated Jul. 23, 2018, 4 pages.

Ying Zhou et al., "*Mobile Agent-based Policy Management for Wireless Sensor Networks,*", Wireless Communications, Networking and Mobile Computing, 2005, Proceedings 2005 Int'l Conference on Wuhan, China, vol. 2, (Sep. 23, 2005), pp. 1207-1210.

European Search Report, PCT/US2015/017212.

Chen et al. "Enix: a lightweight dynamic operating system for tightly constrained wireless sensor platforms." Proceedings of the 8th ACM Conference on Embedded Networked Sensor Systems. Nov. 3. 2010 (http://sensys.acm.org/2010/Papers/p183-Chen.pdf).

International Search Report and Written Opinion, PCT/US2015/017251.

International Search Report and Written Opinion, PCT/US15/17470.

International Search Report and Written Opinion, PCT/US15/17481.

International Search Report and Written Opinion, PCT/US2012/017477.

International Search Report and Written Opinion, PCT/US2015/017680.

International Search Report and Written Opinion, PCT/US15/17688.

International Search Report and Written Opinion, PCT/US15/17696.

International Search Report and Written Opinion, PCT/US15/17931.

International Search Report and Written Opinion, PCT/US15/17702.

"Inter-Task Register-Allocation for Static Operating Systems", V. Barthelmann, *LCTES '02—SCOPES '02*, Jun. 19-21, 2002, Berlin, Germany, pp. 149-154.

"Minimizing Stack and Communication Memory Usage in Real-Time Embedded Applications", H.1 Zeng et al.,*ACM Transactions on Embedded Computing Systems,* vol. 13, No. 5s, Article 149, Publication date: Jul. 2014.

* cited by examiner

PREEMPTIVE OPERATING SYSTEM WITHOUT CONTEXT SWITCHING

BACKGROUND

This description relates to operation of constrained devices such as those used for embedded applications where process updates to the devices are periodically required.

One example of a constrained device is a sensor element in security, intrusion and alarm systems installed on commercial or residential premises. Security systems often include an intrusion detection panel that is electrically or wirelessly connected to a variety of sensors. Those sensors types typically include motion detectors, cameras, proximity, heat, smoke, sensors, etc. These sensors are often implemented as constrained computing devices that is devices having substantially less persistent and volatile memory than other computing devices, sensors, etc. Currently examples of constrained devices would be those with less than about a megabyte of flash/persistent memory, and less than about 10-20 kbytes of RAM/volatile memory).

Updating firmware on such devices typically involves boot-loading that requires transmission of the entire executable code image over a communications interface even if only a portion of the code changes. Another approach involves a preemptive operating system. A commercial real-time operating system (RTOS) is often marketed with data describing RAM usage on a per-task basis using context switching.

SUMMARY

Constrained devices are characterized as such and are configured in this manner generally due to cost/physical configuration considerations. It is difficult to update the firmware on such a constrained device, and when such updates occur it is through a "bootloader," which receives the new firmware via a communications link and stores the new firmware in persistent memory, validates the new code, and then performs a special rebooting process (controlled by the bootloader) to replace the old code or "image" with the new image. However, updating firmware using traditional boot-loading requires transmission of the entire executable code image over the communications interface even if only a portion of the code changes. However, this approach wastes valuable communications bandwidth.

Thus, this boot-loading process has drawbacks because even small changes in stored parameters or computer code require that the entire image be replaced. Bootloading is time-consuming and potentially dangerous to the overall system, because if anything goes wrong (e.g., power loss) when writing the new code to the final location, the device can be rendered useless, requiring factory repair. Also boot-loading necessarily means "rebooting" the device which requires the re-initialization of all of its peripheral drivers and communication links, network connections, reconfiguring of applications, and so forth. Because of these drawbacks bootloading and firmware updates relying on boot-loading should not be part of day-to-day operation of constrained devices.

Preemptive operating systems that employ context switching by necessity incurs costs in transfer of state conditions of currently executing processes to RAM, both in terms of RAM usage and speed. Such considerations make such operating systems less desirable for a hard-real-time operating system (RTOS).

According to an aspect, a computer program product tangibly stored on a computer readable hardware storage device includes instructions to schedule by the processor user-defined independently executable functions to execute from a single stack common to all user-defined independently executable functions according to availability and priority of the user-defined independently executable functions relative to other user-defined independently executable functions, with the instructions to schedule further configuring the processor to identify a particular user-defined independently executable function as ready to run, which user-defined independently executable functions is of higher priority than a user-defined independently executable function currently running. preempt the currently running user-defined independently executable function by the instructions placing the particular user-defined independently executable function on the single stack that has register values for the currently running user-defined independently executable function, pushing down the state data of the currently running user-defined independently executable function lower in the stack, execute the particular user-defined independently executable function and pop from the stack those register values of the current running user-defined independently executable function, after execution of the particular user-defined independently executable function.

According to an aspect, a method is executed in a computing system that includes processor and memory the method includes scheduling by a processor in the computing systems, user-defined independently executable functions to execute from a single stack common to all user-defined independently executable functions according to availability and priority of the user-defined independently executable functions relative to other user-defined independently executable functions, identifying by the processor a particular user-defined independently executable function as ready to run, which user-defined independently executable functions is of higher priority than a user-defined independently executable function currently running, preempting by the processor, the currently running user-defined independently executable function by placing the particular user-defined independently executable function on the single stack that has register values for the currently running user-defined independently executable function, pushing down the state data of the currently running user-defined independently executable function lower in the stack, executing by the processor the particular user-defined independently executable function, and pushing up by the processor in the stack those register values of the current running user-defined independently executable function, after execution of the particular user-defined independently executable function.

According to an aspect, a method a constrained device includes a processor device, configured to schedule user-defined independently executable functions to execute from a single stack common to all user-defined independently executable functions by the processor according to availability and priority of the user-defined independently executable functions relative to other user-defined independently executable functions, with the instructions to schedule further configuring the processor to, identify a particular user-defined independently executable function as ready to run, which user-defined independently executable functions is of higher priority than a user-defined independently executable function currently running, preempt the currently running user-defined independently executable function by the instructions placing the particular user-defined independently executable function on the single stack that has register values for the currently running user-defined independently executable function, pushing down the state data of the currently running user-defined independently executable function lower in the stack, execute the particular user-defined independently executable function, and pop from the stack those register values of the current running user-defined independently executable function, after execution of the particular user-defined independently executable function.

The following are some embodiments within one or more of the above aspects.

It is part of a real-time operating system for execution on a constrained device. To schedule invokes preemption by directly calling a wrapper function for the particular user-defined independently executable function. To schedule invokes preemption by an interrupt service routine and marks the currently running user-defined independently executable function for execution upon return from the interrupt. The stack saves register values for all user-defined independently executable functions, interrupt service routines, and operating system routines. The saved register values for any preempted user-defined independently executable functions, interrupt service routines, and operating system routines are compiled saved values. When the new function completes running and returns, all its stack usage is popped and the currently running function resumes running.

Depending on situations and needs over time, transient sub-programs are added and removed, effectively changing the executable code the device contains. For many applications this may need to be done with little notice and in a way which is not conducive to traditional bootloading. During code update the device is available for other work (e.g., interrupt-based collection, reporting of sensor events and communications with external devices). Execution of routines on these devices occurs without the attendant overhead involved in context switches by pushing a new process onto a single stack that stores register values. The device includes a network interface to interface the device to a network. The device includes a storage device storing a computer program product including instructions to configure the processor device to schedule the user-defined independently executable functions to execute.

The details of one or more embodiments of the invention are set forth in the accompanying drawings and the description below. Other features, objects, and advantages of the invention is apparent from the description and drawings, and from the claims.

DETAILED DESCRIPTION

Described herein are examples of network features that may be used in various contexts including, but not limited to, security/intrusion and alarm systems. Example security systems may include an intrusion detection panel that is electrically or wirelessly connected to a variety of sensors. Those sensors types may include motion detectors, cameras, and proximity sensors (used, e.g., to determine whether a door or window has been opened). Typically, such systems receive a relatively simple signal (electrically open or closed) from one or more of these sensors to indicate that a particular condition being monitored has changed or become unsecure.

For example, typical intrusion systems can be set-up to monitor entry doors in a building. When a door is secured, a proximity sensor senses a magnetic contact and produces an electrically closed circuit. When the door is opened, the proximity sensor opens the circuit, and sends a signal to the panel indicating that an alarm condition has occurred (e.g., an opened entry door).

Data collection systems are becoming more common in some applications, such as home safety monitoring. Data collection systems employ wireless sensor networks and wireless devices, and may include remote server-based monitoring and report generation. As described in more detail below, wireless sensor networks generally use a combination of wired and wireless links between computing devices, with wireless links usually used for the lowest level connections (e.g., end-node device to hub/gateway). In an example network, the edge (wirelessly-connected) tier of the network is comprised of resource-constrained devices with specific functions. These devices may have a small-to-moderate amount of processing power and memory, and may be battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Figure 1:
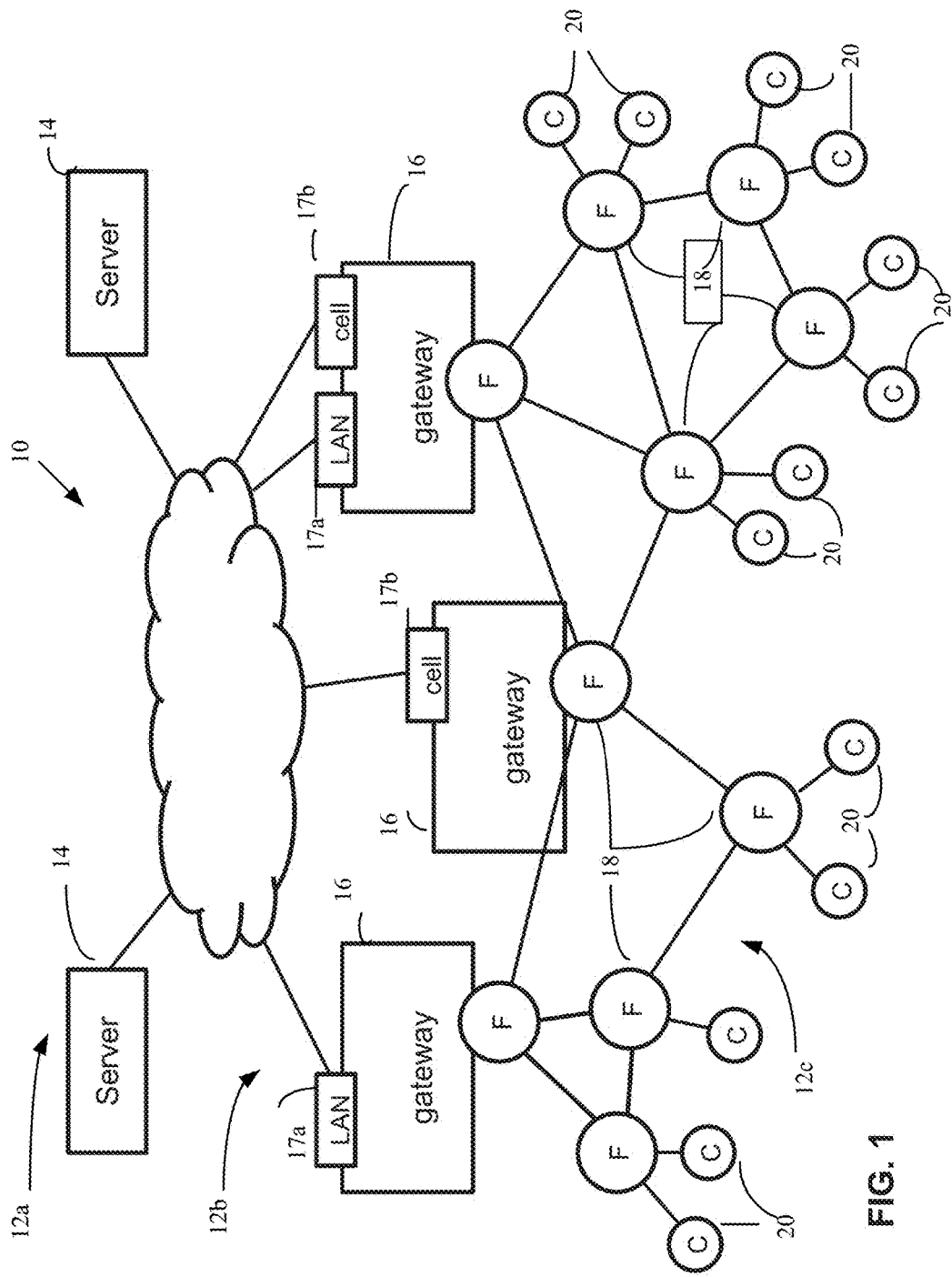
FIG. 1 is a schematic diagram of an exemplary networked security system.

Referring now to FIG. 1, an exemplary (global) distributed network topology for a Wireless Sensor Network (WSN) is shown. In FIG. 1 the distributed network 10 is logically divided into a set of tiers or hierarchical levels 12a-12c.

In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 10.

Figure 2:
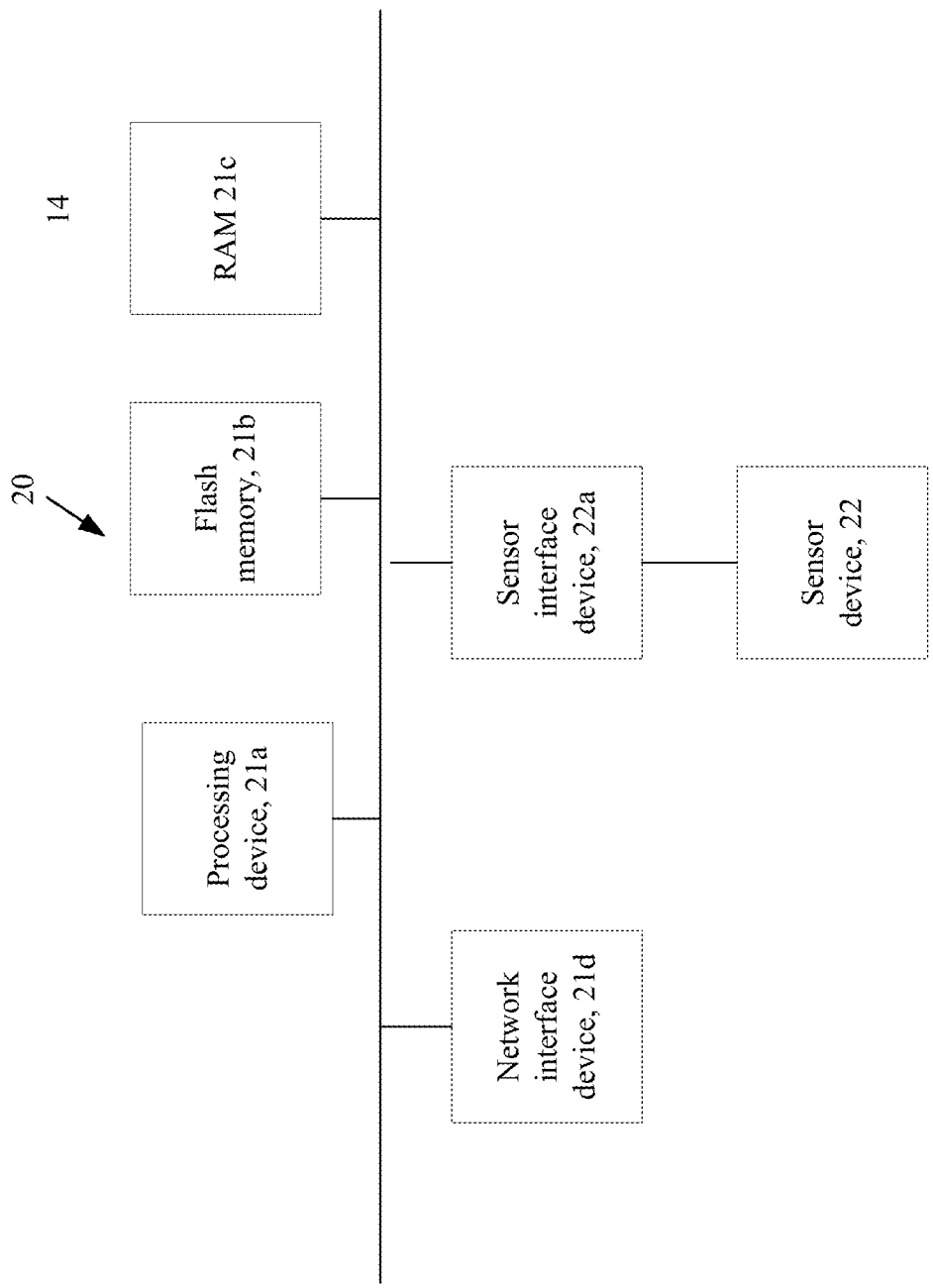
FIG. 2 is a block diagram of constrained device.

Referring momentarily to FIG. 2, a generic constrained computing device 20 is shown. A constrained device 20 as used herein is a device having substantially less persistent and volatile memory other computing devices, sensors, systems in a particular networked detection/sensor/alarm system. Constrained device 20 includes a processor device 21a, e.g., a CPU and or other type of controller device that executes under an operating system, generally with 8-bit or 16-bit logic rather than the 32- and 64-bit logic used by high-end computers and microprocessors. The constrained device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less. The constrained device 20 has a network interface card 21d that interfaces the constrained device 20 to the network 10. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor 22 and a sensor interface 22a that interfaces to the processor 21a. Sensor 22 can be any type of sensor type device. Typical types of sensors include temperature, simple motion, 1-2- or 3-axis acceleration force, humidity, pressure, selective chemical, sound/piezo-electric transduction, and/or numerous others, implemented singly or in combination to detect complex events.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations. These types of constrained devices 20 generally have a static software image (i.e., the logic programmed into the constrained device is always the same).

Referring back to FIG. 1, in a typical network, the edge (wirelessly-connected) tier of the network is largely comprised of highly resource-constrained devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

The WSN 10 implements a state machine approach to an application layer that runs on the lower tier devices 18 and 20. Discussed below is an example of a particular implementation of such an approach. States in the state machine are comprised of sets of functions that execute in coordination, and these functions can be individually deleted or substituted or added to in order to alter the states in the state machine of a particular lower tier device.

The WSN state function based application layer uses an edge device operating system (not shown, but such as disclosed in the above mentioned provisional application) that allows for loading and execution of individual functions (after the booting of the device) without rebooting the device (so-called "dynamic programming"). In other implementations, edge devices could use other operating systems provided such systems allow for loading and execution of individual functions (after the booting of the device) preferably without rebooting of the edge devices.

RTOS for Constrained Devices

Figure 3:
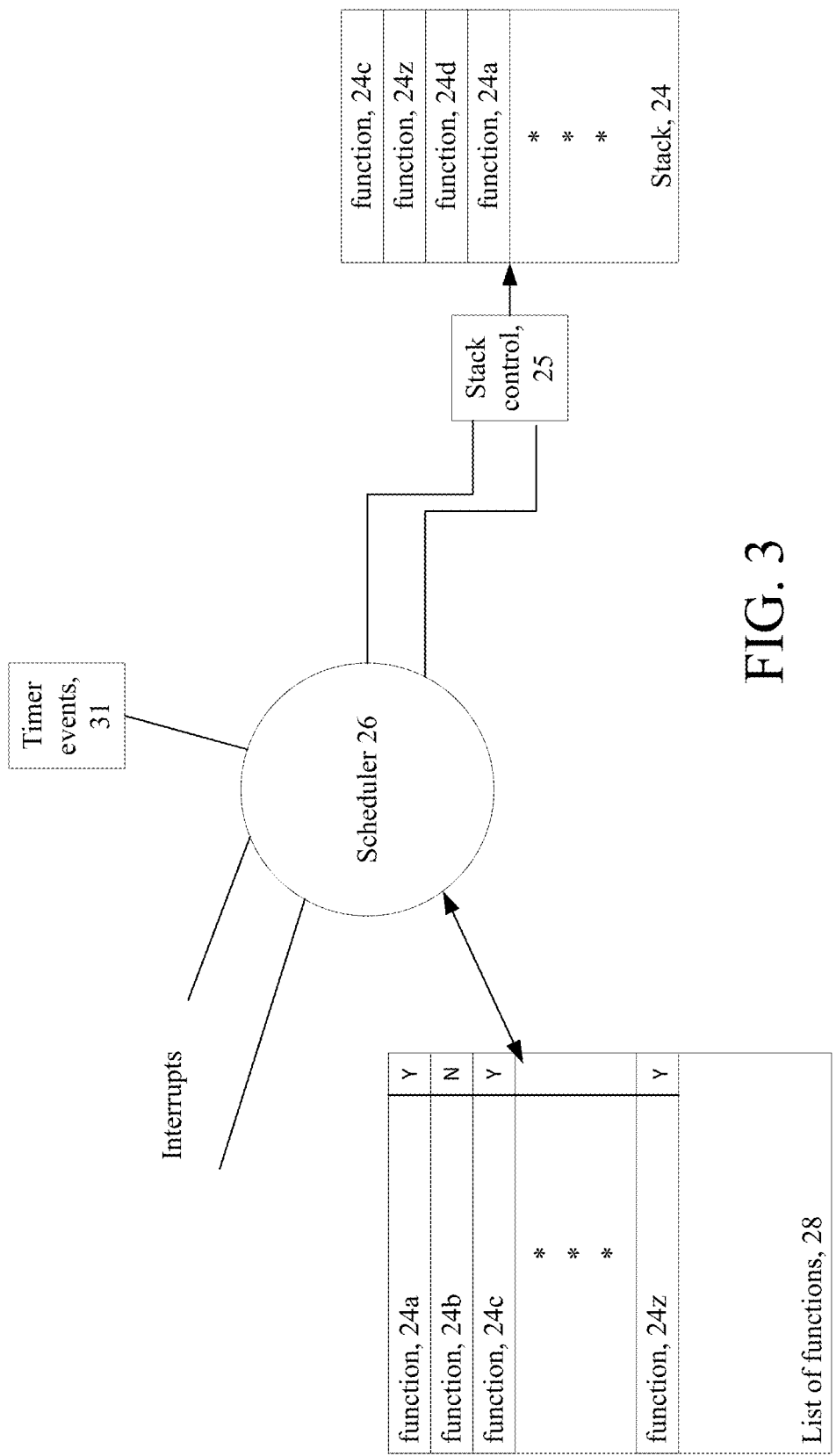
FIG. 3 is a block diagram useful in understanding a stack structure.

Referring to FIG. 3, stack process details for an operating system for constrained device 20 that includes wireless dynamic programming and support are shown. The constrained device 20 includes a real-time operating system ("RTOS") for executing and otherwise managing a dynamic set of user-defined independently executable functions or tasks that are either built into a loaded image (software and RTOS that executes on the constrained device) or that are downloaded during normal operation of the constrained device 20 or a combination of the two, with the former (built into the image) using as subroutines instances of the latter (downloaded during operation).

Stack Management

The RTOS is for constrained devices and uses a scheduling function 26 referenced through a management structure (e.g., an array or linked list of pointers to function locations), according to availability (readiness of the function to run) and priority (the criticality of the function relative to other functions). This scheduler 26 function periodically evaluates functions that are not currently running on the constrained device, e.g., as in a list, 28 to determine whether any of these functions are ready to run. In addition the scheduler 26 is responsive to interrupt(s) that indicated a function or functions are ready to run by either supplying data to a pended function or counting down of a timer event 31 for a function that has suspended execution.

In either case, if a function is found ready to run that is of higher priority than the function currently running (or of equal priority if the current function has pended execution waiting for data) has identified, that identified function is run without the prior saving of the old function to another place in RAM (i.e., without traditional context switching or saving of the processor's operating register values). A stack 24 has functions stored, e.g., in order 24c, 24z, 24d and 24a, according to respective priorities. When a new function is ready to run of the highest priority, e.g., 24c, the stack functions of remaining functions, e.g., 24z, 24d and 24a simply remain in place on the single stack 24 of the processor as the newly running, preempting function pushes its data on top of the active function's stack.

When the new function completes running and returns, all its stack usage is popped via stack control 25 and the old function, e.g., 24z, resumes running, oblivious to the interruption, as transparently as if a traditional context switch had occurred. Thus, the scheduler 26 uses a single processor stack rather than formal context switching to save the state of pre-empted functions.

This saves a non-trivial amount of RAM by not having multiple stacks, thus allowing for more independently executable functions, as well as saving the processor time required to do the formal context switching and it simplifies the logic and, therefore, the code size associated with the scheduler 26.

Dynamic Programming

The disclosed operating system is conducive to dynamic programming because new functions (executable functions loaded into the device via a communications link) can be added to the scheduler's list of executable functions by simply adding the new functions to the management structure (array or linked list of function pointers), updating the related readiness and priority information in the scheduler variables, and producing any necessary links between old and new code (return addresses, global variable locations, etc.). If and when a dynamic function is no longer needed, the dynamic function can simply be removed from the management structure and it links dissolved and memory reclaimed.

The use of dynamic programming methods running on top of the operating system described below allows for a constrained device to effectively use of a set of executable functions many times larger than would fit into its memory at any single instant in time. The operating system below includes methods by which a node requesting executable code that the node needs and does not possess to obtain the code, while also guaranteeing that the node's current set of executable functions are all of the proper type and version (executable set self-consistency). Furthermore, executable code can be cached in network locations convenient for rapid transfer to constrained devices as soon as the executable code is needed by the constrained devices. Also described below are methods for managing the "freshness date" and expiration of executable code for that code which should be used for only a limited period of time in the constrained device.

Figure 4:
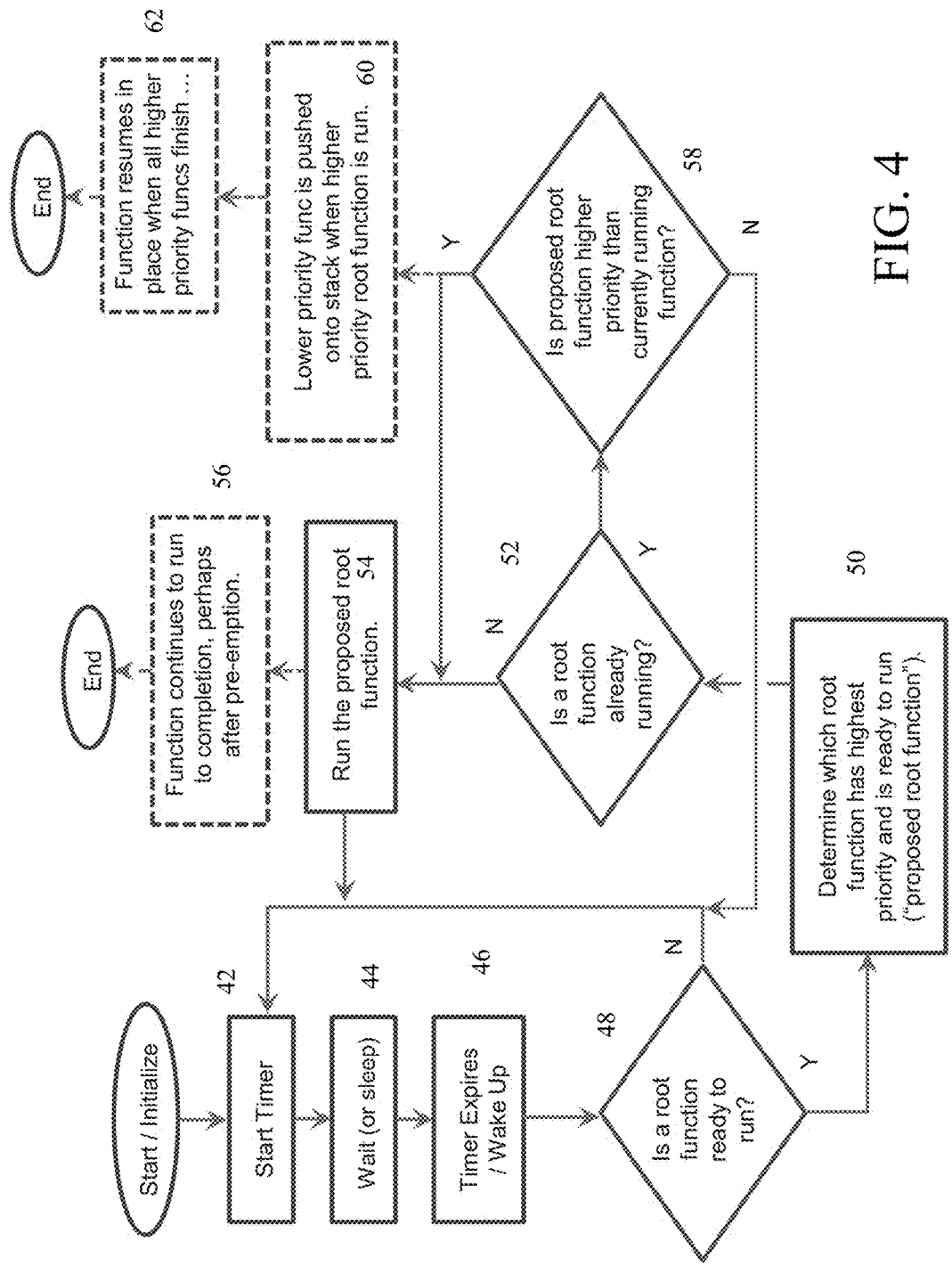
FIG. 4 is a flow chart of scheduler processing in a real time operating system.

Referring now to FIG. 4 actions taken by the scheduler 26 of the operating system to manage the prioritized execution of a set of root functions is shown. The functions managed directly by the scheduler 26 are referred to as "root functions" because they themselves can call other functions, which in turn may call various other functions, and this branching of function calls has a structure analogous to the branching of limbs in a tree.

Ultimately all function execution stems back, like the branches of a tree, to the primary/first/root function that was called (i.e., executed) initially by the scheduler 26. The distinction between a root function and a regular (non-root) function is that a non-root function is not managed by the scheduler 26, and can only run when explicitly called by the currently running function. A root function is somewhat like standard operating systems' threads or tasks.

The scheduler 26 may alternatively simply round-robin through the root functions from the highest in priority to the lowest, executing each that is ready to run; or the scheduler 26 may be configured (as is presumed to be the most likely scenario) to execute the highest in priority ready to run and after executing that, again seek the highest in priority ready to run, and keep repeating that sequence until reaching and executing the root function lowest in priority.

In some embodiments, the lowest priority root function will, for power-constrained devices, start a timer and wait (enter sleep mode) and when the device is awakened by some configured interrupt, the scheduling sequence is again performed; in non-power-constrained devices, the lowest priority function would simply service a watchdog timer, or perform self-test, or both, and then the scheduling sequence would repeat.

Thus, as shown in the FIG. 4, a timer is set up 42 and run with the purpose of controlling the frequency with which the scheduler 26 examines the state of the set of root functions. The scheduler 26 waits (enter sleep mode) 44 for a scheduler timer event. When the timer expires 46 the scheduler 26 determines 48 whether or not ANY of the root functions in its list is ready to run (e.g., via a variable associated with each root function with possible values of "ready to run", "pended", "killed", etc.). If any root function is ready to run, the scheduler 26 needs next to determine, which of all of the ready-to-run root functions, is the function with the highest priority 50 (which becomes the "proposed root function"). If no other root function is running, 52 the proposed root function is run immediately, runs to completion, and exits 54 (although it may during the course of running be interrupted by being pre-empted by an even higher priority root function using the process described here 56).

Figure 7:
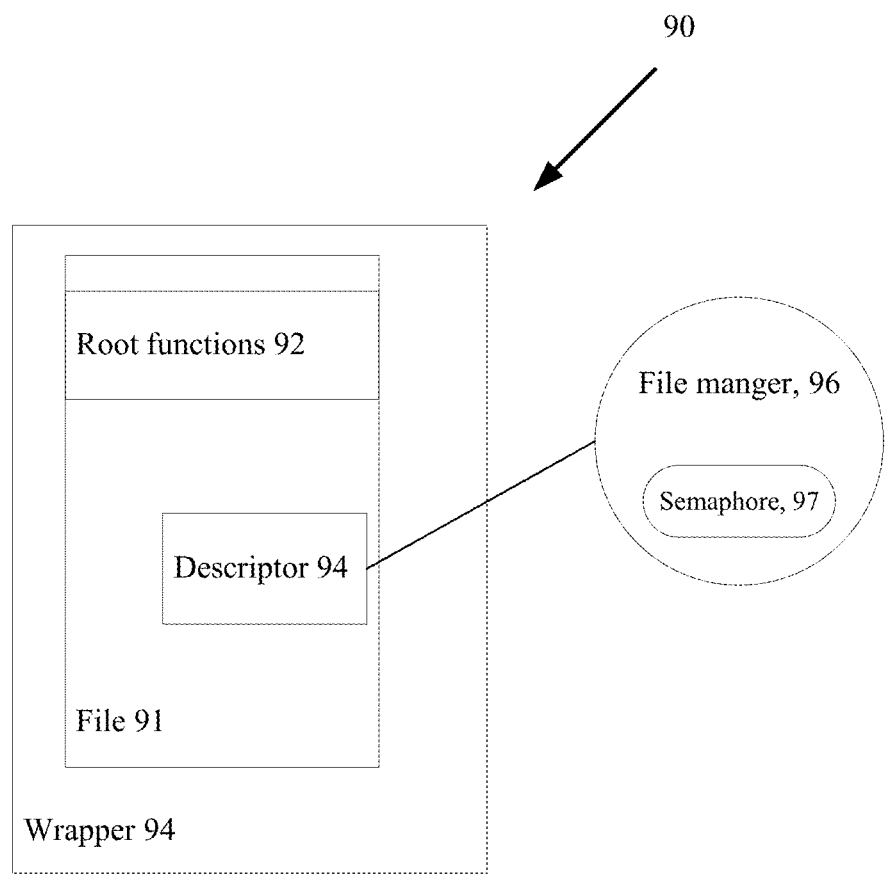
FIG. 7 is block diagram showing function encapsulation.

If a root function is already running then the scheduler 26 compares 58 priorities of the currently running root function and the proposed root function. If the proposed root function's priority is lower, nothing happens and the scheduler 26 goes back to sleep to await another scheduler timer wakeup event. If on the other hand the proposed root function's priority is higher, the scheduler 26 immediately runs 60 the proposed root function. The dotted line boxes and arrows in the FIG. 7 show processor behavior in response to the running of a new root function (e.g., the currently running root function is pushed onto the stack). The function that was running resumes 62 in place when all higher priority functions have finished processing.

Figure 5:
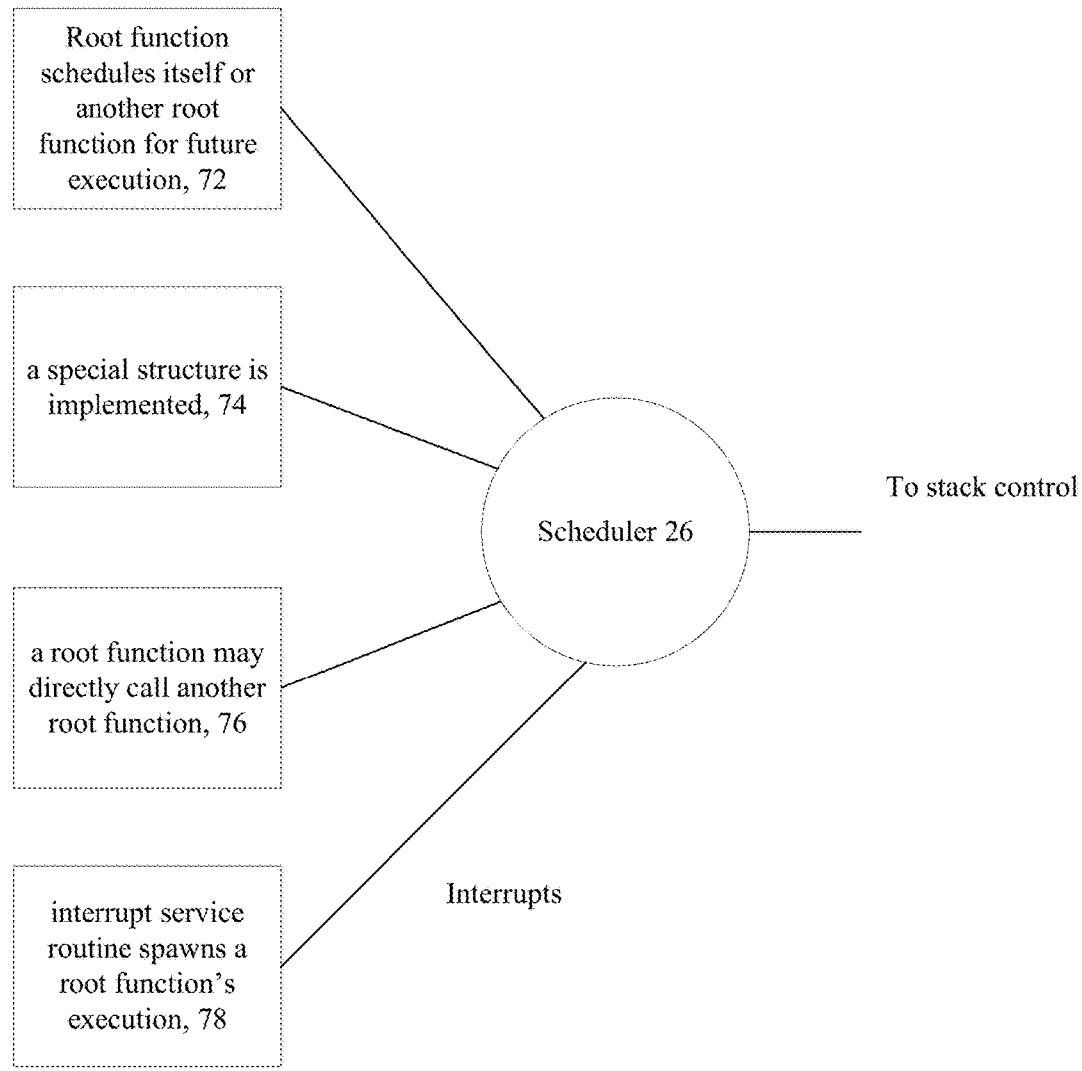
FIG. 5 is block diagram useful in understanding scheduling.

Referring now to FIG. 5, other mechanisms, e.g., here four mechanisms shown can spawn a root function. For example, a root function can schedule itself or another root function's execution in the future which will be spawned from a periodic timer's interrupt, a special structure that is implemented; a ring buffer coupled with a pointer to a root function that is the sole consumer of its data, will awaken that consuming root function, should it be in a pended state, upon being provided with a threshold amount of data, a root function may directly call another root function for, for example, the arrival of data that other root function should process, or an interrupt service routine may spawn a root function's execution. In all these instances, the scheduler 26 immediately executes the root function requested to spawn if that root function has of an equal or greater priority than the root function then running. Otherwise, if the former has a lower priority than the latter, the former is put into a state "ready to run" that permits it to run the next chance it has to be scheduled.

Figure 6:
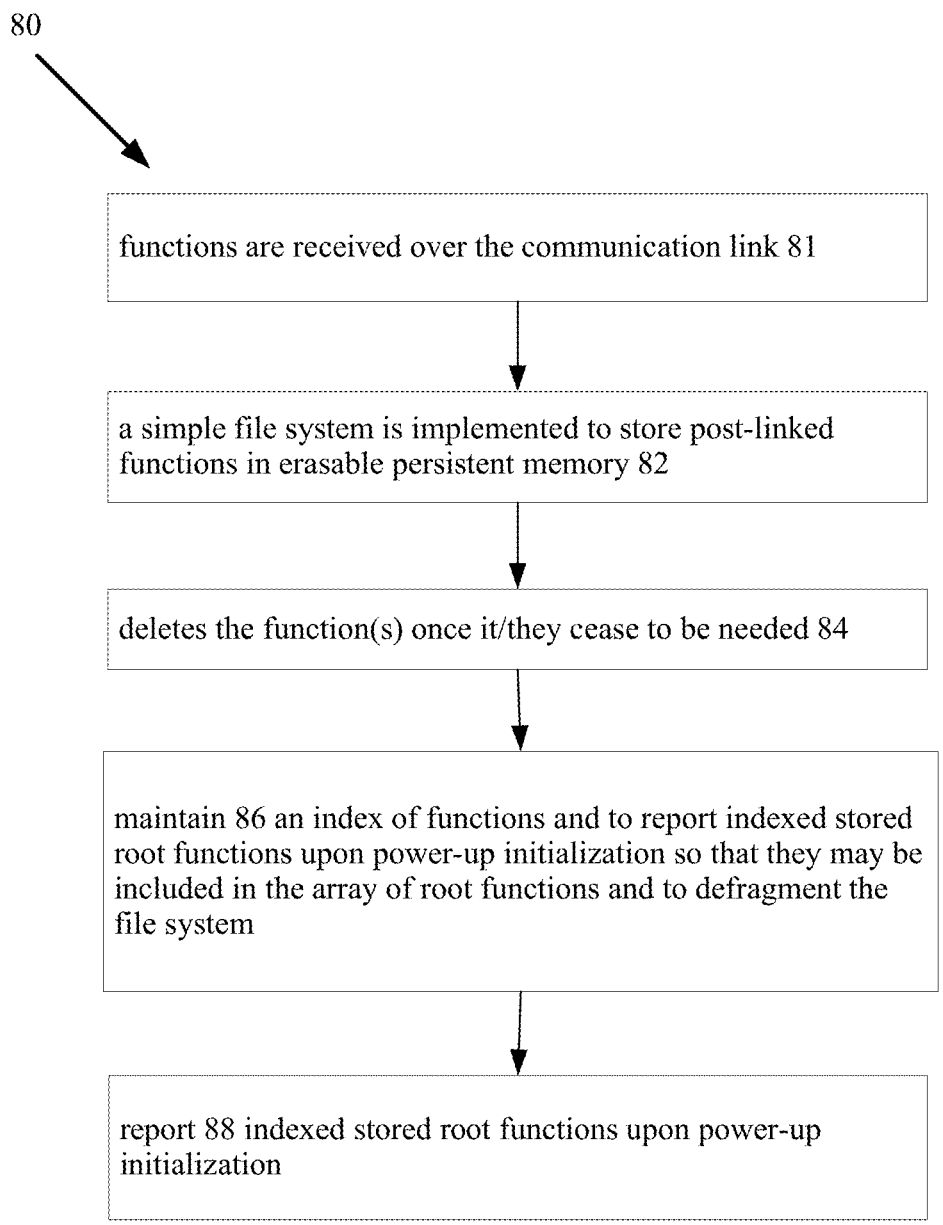
FIG. 6 is flow chart showing processing for functions.

Referring to FIG. 6, for implementation 80 of post-linked functions (i.e., functions loaded over a communications link) especially for post-linked root functions several mechanisms are provided. For example, when the functions are received over the communication link 81, a simple file system is implemented to store post-linked functions in erasable persistent memory (e.g., flash) 82 when the functions are received over the communication link, schedule deletes the function(s) once it/they cease to be needed and maintain 86 an index of functions and to report 88 indexed stored root functions upon power-up initialization so that the functions may be included in the array of root functions and defragment the file system.

Defragmenting the file system requires locks (binary semaphores) to prevent either an executing function from being relocated consequent to defragmentation or for a function that is being moved during defragmentation from being executed.

Post-linked functions require additional data, as explained below, in order to be utilized and, thus, they need to be wrapped with other data in a file; non-root post-linked functions require some but fewer data, as implied below, in such a wrapper.

Post-linked root functions need to be added to the array of root functions when they are received into to the file system and they need to be deleted from that array when ceasing to be used, thus requiring that that array be a linked list. Thus, post-linked root functions are scheduled exactly like root functions linked into the application with the scheduler 26.

Referring now to FIG. 7, post-linked root functions, in order to be in the array of root functions, require a descriptor structure as other root functions. However, because the descriptor structure needs to include addresses such as those of the executable code for the root function, the descriptor would necessarily not exist verbatim in the file in which the post-linked root function resides because its location in memory is not known until the file manager writes the location.

This problem is addressed by including a wrapper 94 of the file 91 containing the function 92, a structure 96 from which the post-linked function's descriptor can be constructed in RAM. While other root functions' descriptors reside in ROM and need never to be altered, a post-linked root function's descriptor needs to be altered whenever the function is relocated for defragmentation and, so, when a file manager 96 seeks to relocate the function, it acquires the appropriate semaphore 97 and adjusts the descriptor in addition to moving the file containing the function.

Post-linked functions that are not root functions likewise have a relocatable base address and in the process of relocation need to locked against execution and while executing need to be locked against relocation, but since there is no root function descriptor constructed for it, its relocation involves a subset of a root function's relocation.

The operating system additionally needs to allocate some RAM for post-linked functions, all requiring storage of their base address of their ROM and RAM, explained and described below, and, optionally, any global variables that statically persist for the life of the function, and for root functions, the descriptor described above. Real-time systems do not typically have dynamically allocated memory because this introduces non-deterministic behavior into the system.

The scheduler 26, furthermore, is constrained by not having the resources for garbage collection (memory recovery) which is expensive in terms of both code footprint and execution time.

Figure 8:
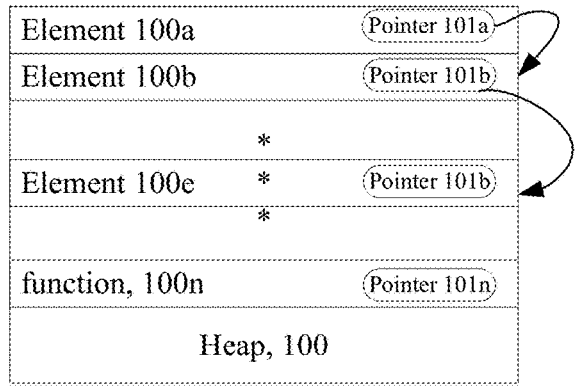
FIG. 8 is block diagram of a heap.

Referring now to FIG. 8, the operating system implements a specialized heap 100, therefore, for post-linked functions to obtain their root function variable data and any other variable data needed. An allocation from the heap 100 can be made only during the initialization of a post-linked function and then only once for each initialization function call. Assuming the device has a single, contiguous bank of RAM, the heap grows from the opposite end of RAM as does the stack 24, growing toward the stack 24, and shrinks back when the most recently added post-linked function terminates. Because the heap 100 exists only to provide RAM to post-linked functions, its structure can be, and is, inexorably intertwined with its reason for existence.

Starting from the first available position in RAM, each element 100a-100n contains a pointer to the start of the next valid element since its size cannot necessarily be determined from the previous field because the latter may reflect a hole consequent to a post-linked function's removal.

Figure 8A:
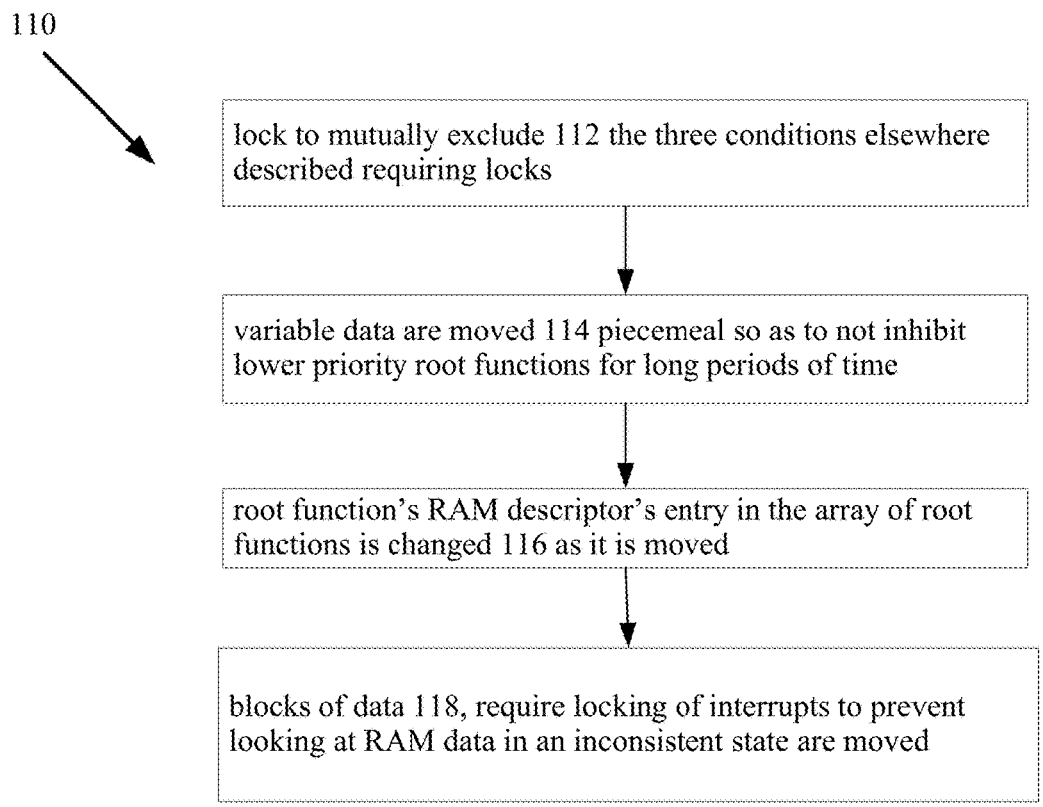
FIGS. 8A-8C are flow charts of processing involving the heap.

Referring now to FIG. 8A, such holes are cleaned up using a high-priority root function 110 built into the scheduler 26. This root function uses a fourth lock to mutually exclude 112 the three conditions elsewhere described requiring locks. Once the lock is obtained, the variable data are moved 114 piecemeal so as to not inhibit lower priority root functions for long periods of time. A root function's RAM descriptor's entry in the array of root functions needs to be changed 116 as it is moved and that, together with certain other blocks of data 118, require locking of interrupts to prevent looking at RAM data in an inconsistent state, which would wreak havoc in the scheduler 26. The blocks of data are the base addresses of the function's RAM and ROM to restore, as described below, when the function is executed, the RAM copy of the root function's descriptor, the variable data pointed to by the root function's descriptor, and to local data for the root function.

Figure 8B:
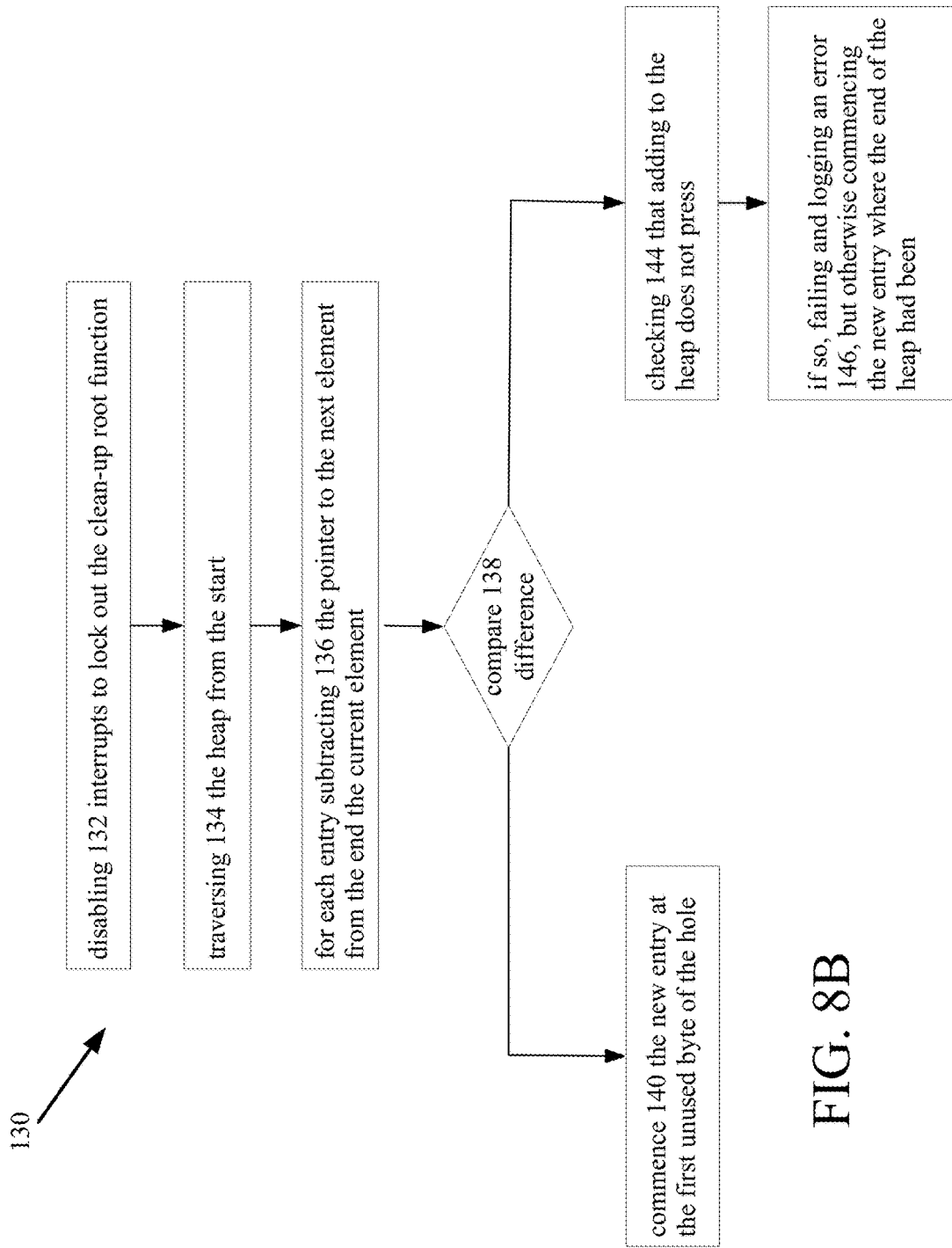

Referring now to FIG. 8B, adding 130 an element to the heap entails disabling 132 interrupts to lock out the clean-up root function described above, traversing 134 the heap from the start, and for each entry subtracting 136 the pointer to the next element from the end the current element and comparing 138 the difference to the requested number of bytes and if the latter is smaller than the former, then commencing 140 the new entry at the first unused byte of the hole but otherwise, if the last entry of the heap is encountered, 142 checking 144 that adding to the heap does not press closely against the stack (the tolerance of how close being configured by the application) and, if so, failing and logging an error 146, but otherwise commencing the new entry where the end of the heap had been.

For a post-linked root function, the descriptor needs to now be constructed and other RAM initialized, the details of which are not described here for the sake of brevity.

Figure 8C:
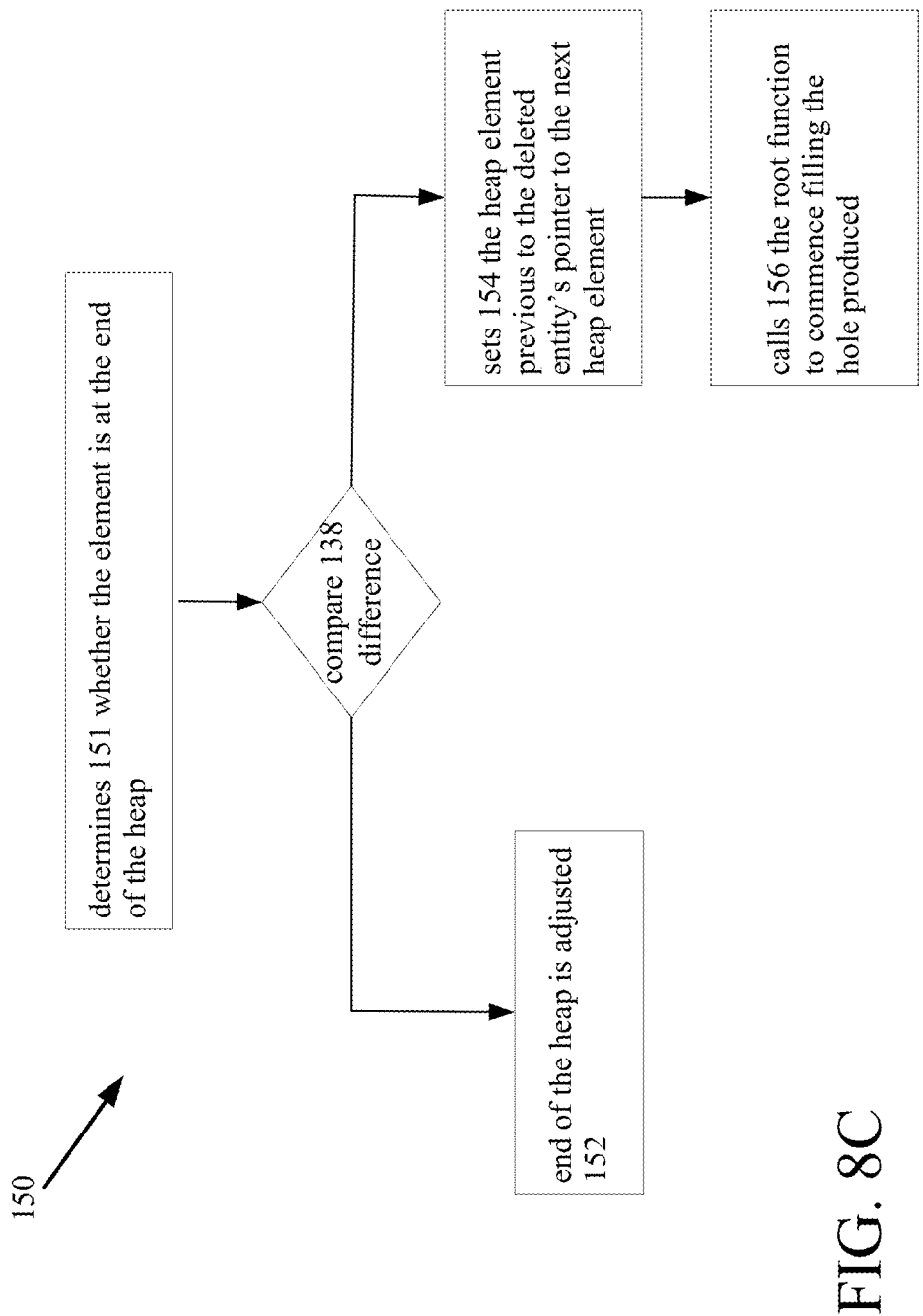

Referring now to FIG. 8C, to remove 150 an element from the heap, the scheduler 26 determines 151 whether the element is at the end of the heap, in which case the end of the heap can simply be adjusted 152, but otherwise, sets 154 the heap element previous to the deleted entity's pointer to the next heap element, i.e., unlinks the parameter's element out of existence thus producing a hole in the heap, and the calls 156 the root function referenced above to commence filling the hole produced. Thus, this is simpler than garbage clean-up algorithms but also being more constrained by the real-time requirements, has some innovative complexities.

Another lock, of short duration, is implemented for post-linked root functions so that when the scheduler 26 traverses the list of root functions, it will bypass any function that is in the process of having its descriptor or associated data moved.

The operating system also allows post-linked root functions to access utilities linked into the scheduler 26; especially, post-linked functions that communicate with other root functions and with device drivers. Since a post-linked function may not necessarily know where such functions are in any particular build, the scheduler 26 therefore implements a vector table for referencing any and all internal functions that a post-linked function can use.

Among the functions in the vector table are interfaces to ring buffers, optionally bound to a root function so that that root function can be awakened from a pended state and also so that post-linked root functions can publish such queues and other root functions or interrupt service routines can identify such queues that a post-linked function can instantiate from its allocated pseudo-global data. The publishing mechanism involves a linked list that commences with a pointer linked into the scheduler 26 that can point to an entry reserved for this purpose in the post-linked function's RAM data, and the latter can point into another such entity, and so forth. Any root function or interrupt service routine linked into the scheduler 26 needs to be programmed to expect such a link, and any pair of post-linked root functions expecting to communicate with each other need likewise to be programmed. A handshake mechanism is provided for by the functions that access the described queues.

The operating system provides for post-linked functions to use the internal global data by 1) requiring the function to declare all such data in a structure 2) produce a pointer to such a structure 3) not initialize that pointer. Each time the post-linked function is executed, the pointer to the said structure is supplied by the scheduler 26.

Thus, when a RAM clean-up is performed, the value of that pointer will differ from its value the previous time the post-linked function had been executed, but since its contents have been moved, that will be transparent to the post-linked function. Note that the pointer itself is anchored by the array of root functions or, for post-linked functions that are not root functions, anchored by a special descriptor ascertainable by traversing the entries in the heap.

The operating system likewise provides, for executing on a processor that does not support relocatable code, for post-linked functions to reference parts of themselves, e.g., branch functions or constants, by a similar mechanism whereby pointer to those parts are gathered into a structure, etc., as for global data, but let it be noted that the author of such a function on such a device needs to, therefore, call all branch functions via pointers to them.

The scheduler 26 can inhibit the execution of post-linked root functions that are locked, as described above, but for other post-linked functions that are being relocated in ROM or whose RAM is being moved, the scheduler 26 only notes this and returns an error code unique to the situation and, therefore, that it behooves an implementation of such a function to not use that unique code; this furthermore requires that the same type be returned by all non-root post-linked functions.

The utility of post-linked (dynamically loaded and executed) functions rests in the fact that it is not always possible to anticipate what logic is needed in a constrained device at the time the device is programmed and deployed. For example, the device may be a wireless sensor network node designed to sense, filter, and report very specific types of motion of a door, window, or moving asset (e.g., a hand truck or dolly). Because the specific motion filter algorithms/logic are different for each of these objects, and because it is difficult to pre-assign specific devices to specific uses without running into problems of high inventory costs and device staging in the supply chain, it would be inconvenient or expensive for the manufacturer of the device to be required to produce firmware-based motion filters specific to each of these very unique motion types.

Another approach is to produce basic firmware general enough to handle ALL motion event reporting, and factory-program the devices with this generic software. Then, after each node is deployed in the field (e.g., on a window, or a dolly), the required specific types of motion filters are sent to each node according to each node's unique deployment case. The context specific root functions (e.g., motion-type specific motion filters) are combined with other more generic root functions to comprise the software stack running on the device in the field.

Another situation which will certainly arise from time to time is that motion filters require "tuning" or changes in their firmware logic based on results observed in the field. Some filter behavior may be altered simply by changing threshold and other configuration parameter values, and this certainly does not require dynamic programming (loading of new executable code embodying new filtering logic), but there will be other times when the functional forms (math equations) used to implement the motion filtering algorithm need to change, and this can only be accomplished by either (1) including a large set of equation options during factory programming (which leads to an excessively large and likely infeasible code size), or (2) dynamically programming nodes in the field using the methods described. The latter approach is more useful since it can easily be done using iterative means, or even methods derived from machine learning and artificial intelligence concepts.

The nodes may be implemented using any appropriate type of computing device, such as a mainframe work station, a personal computer, a server, a portable computing device, or any other type of intelligent device capable of executing instructions, connecting to a network, and forwarding data packets through the network. The nodes can execute any appropriate computer programs to generate, receive, and transmit data packets for use on the network.

Figure 9:
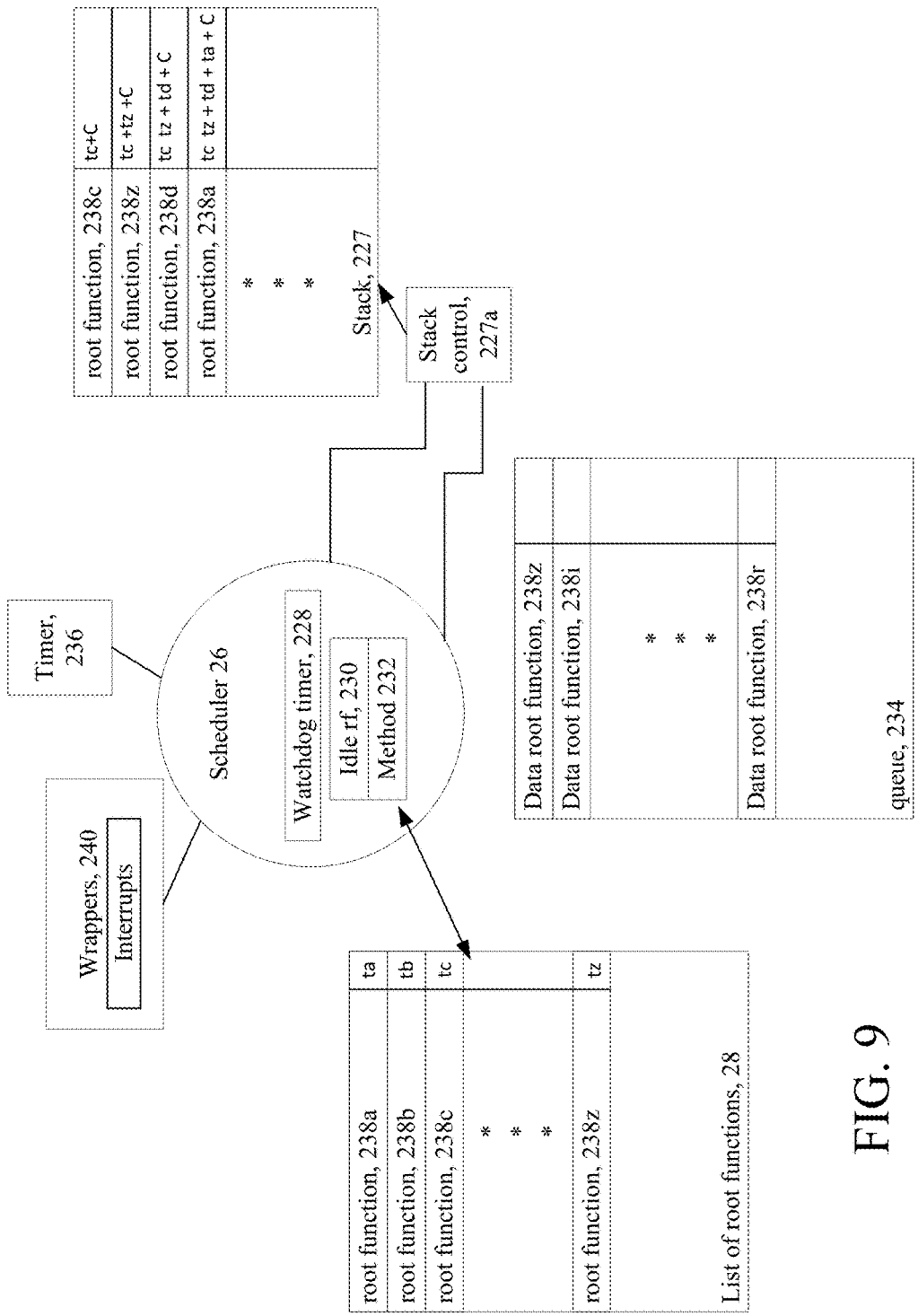
FIG. 9 is a block diagram of a scheduler.

Referring now to FIG. 9, an implementation of a Hard, Real Time Operating System (RTOS), 225 using an implementation 226 of the scheduler 26 (FIG. 5) to manage prioritized execution of a set of root functions using preemption by ready to run root functions is shown. In addition to the scheduler 226, in this implementation of the operating system 225, the Hard, Real Time Operating System (RTOS) 225 also includes a stack 227 and stack control 227a, a watchdog timer 228, an "Idle Root Function" 230, a method task 232, queues 234, a system heartbeat timer 236 and user-defined independently executable root functions 238 (generally and specifically 238a-238z, illustrated) that are part of or are executed by a processor device, as appropriate. A heap (not shown) can be provided as discussed above.

Stack control 227a maintains a stack pointer that is initialized to the top or bottom, according to the CPU design, of the portion of RAM that is not allocated at build time, e.g., to variables, and initializes a pointer to the end of the stack to point to the other end of unallocated RAM. Whenever the stack pointer, points to the end of the stack is set (either initially or altered), the thresholds for stack usage warning and for error are calculated, and an error function is called when that threshold would be exceeded.

In the operating system, the user-defined independently executable root functions 238 are those entities that can preempt or be preempted. However, so as to guarantee essential system tasks take precedence over the user-defined independently executable root functions, the highest priorities shall be reserved for root functions that are internal to the scheduler 226 and operating system 225. The user-defined independently executable root functions 238 are those that are not implemented as infinite loops and are referred to herein again as "root functions." The root functions are grounded in the scheduler 226 and these root functions 238 can call branch subroutines that always return to their root. Each root function 238 has a priority that is configured by the user. Each root function 238 has a state that is maintained by the operating system. The states can be several, but at least are "ready to run," "pended," and "idle" states. In general, states include the following:

1. Idle—root function has no work to perform and no need to be executed.
2. RunNextPass—root function becomes ReadyToRun after the Idle Root Function next executes; this state is meaningful with priority-based scheduling since with round-robin scheduling (discussed above) this behaves the same as ReadyToRun.
3. ReadyToRun—root function needs to be executed when its turn occurs.
4. Pended—root function is waiting for data and will be executed when the data become available; the scheduling routine does not commence execution when in this state.
5. Running—root function is executing, either actively, or passively by being pre-empted.
6. Killed—a linked-in root function that has been terminated due to an error condition which can no longer be executed. Note that a post-linked function is simply removed and, therefore, never needs to enter this state.

The Idle Root Function 230 is a root function executed by the scheduler 226. The scheduler 226 executes the Idle Root Function whenever no other user-defined independently executable root functions 238 is executing. The Idle Root Function 230 is the lowest priority root function. In conjunction with executing the Idle Root Function 230, the scheduler 226 changes states of any user-defined independently executable root function(s) 238 in the state RunNextPass to be in the state ReadyToRun state and services the watchdog timer 228. If the Idle Root Function is not executed, the scheduler 226 may run longer than the period of the watchdog expiration.

The stack 227 has a configured maximum depth of preemption "stack depth" to ensure that the stack depth used by the OS is bounded, because an inability to execute a root function 238 as specified below, will simply cause the root function to enter the "ready to run" state. In this instance, the worst case scenario is that by not being placed on the stack simply results in priority inversion until an active (currently executing) root function 238 returns and its register values are popped off from the stack 227.

Figure 9A:
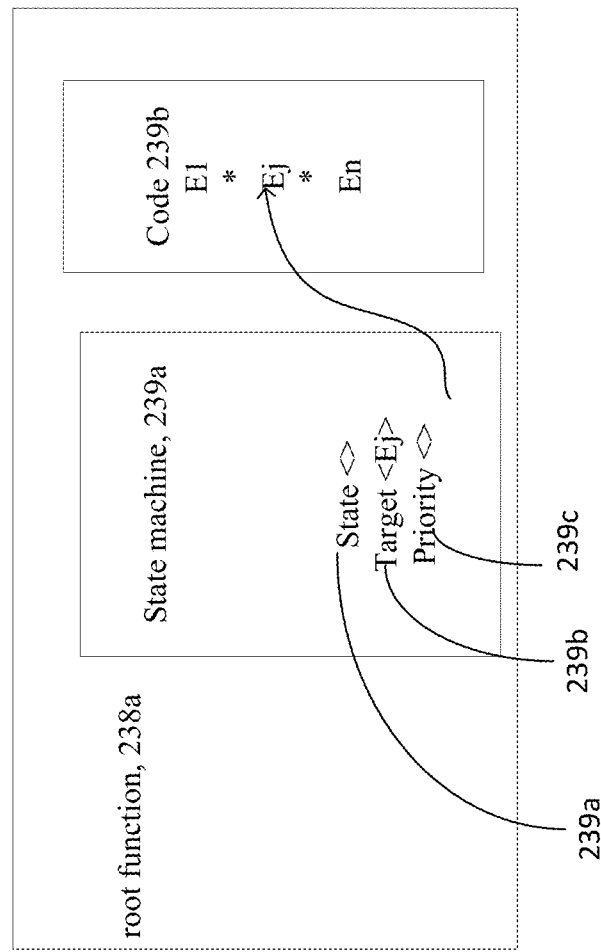
FIG. 9A is a block diagram depicting pictorially a root function.

Referring now momentarily to FIG. 9A, root functions 238 need to return in this embodiment. Therefore, there is no sleep state for a root function 238. Rather, a root function 238 is constructed with an internal state machine 238a so that, for example, the root function 238 may return to a state of "pended" or "idle" and the next time the root function 238 is awakened, the awakened root function's internal state machine 239a determines where the root function exited and causes a branch to appropriate code 239b to continue execution. Root function 238a also has a priority 239c that is configured by the user.

Figure 10:
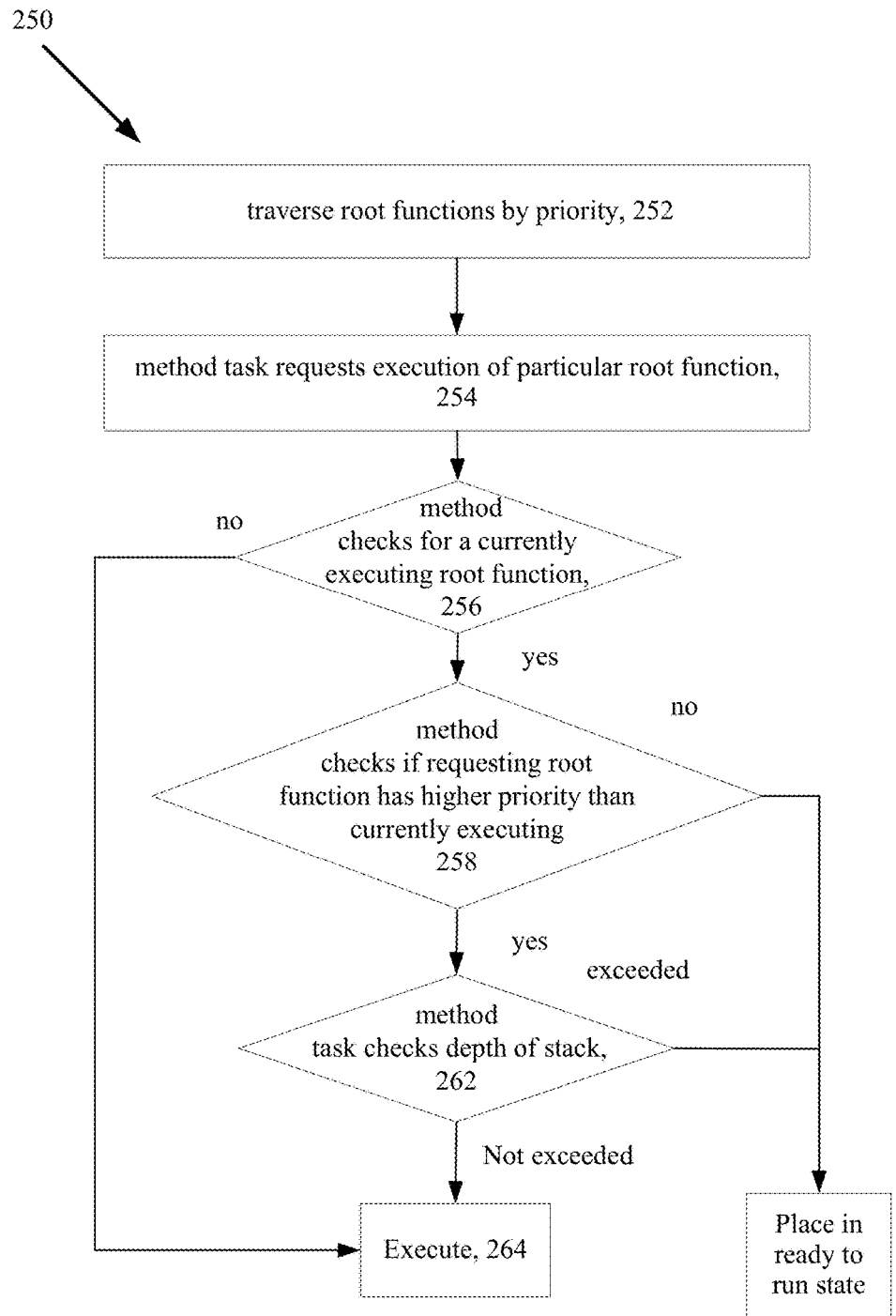
FIG. 10 is flow chart of a scheduler operation.

Referring now to FIG. 10, the scheduler 226 process 250 traverses 252 all root functions by priority and will execute any root function in the state "ready to run" according to priority. The scheduler may configure the transversal in a round robin manner from highest priority root function to lowest or as commencing anew at the highest priority root function following the execution of any root function. The method task 232 is provided to request 254 execution of a root function. The method task 232 checks 256 whether any root function is currently executing and, if so, checks 258 whether a requested root function has a higher priority than the executing one. If none are currently running or the idle root is running, the method executes 264 the requesting function. The method task also checks 262 whether the maximum depth of preemption in the stack has not been met. If the maximum depth has not be met, the requested root function is executed 264; otherwise the requested root function is placed 266 in a state of "ready to run" and returns 268.

During execution, the operating system 225 disables interrupts during a pre-emption so that the sequence is effectively atomic and protected against a root function being partially started and left in an invalid state by pre-emption. By disabling interrupts, signaling techniques such as the use of a semaphore are avoided, which would immensely complicate the logic for pre-emption by an ISR.

Execution can occur, as follows:

Time Expiration becomes Current Time plus the root function's configured maximum run time plus the overhead time required to perform the invocation and return sequences. Root function is invoked pre-emptively, an then a function that collects statistical data for the pre-empted root function is sampled to accrue statistics. Any pre-empted root functions are followed to determine a count of executing functions and, if that count exceeds the configured maximum number of root functions, then an error is logged and the root function's invocation ceases. Otherwise, a value that stores the maximum number of preemptions is updated, if appropriate, to reflect the maximum number simultaneously pre-empted root functions. The time preempted for the pre-empted root function becomes the current time and a pointer for the invoked root function becomes the pointer to a ROM descriptor of the root function that the preempting root function is pre-empting.

Returning back to FIG. 9, the scheduler 226 directly invokes this method and any root function may likewise directly invoke this method. In addition, the method may be spawned by as a method to request a root function be executed a certain number of timer ticks in the future.

Queues 234 are shared by root functions 238. In this example data from root functions 238z, 238i and 238r are shown. The root functions allow designation of a receiving root function to act as consumer of data in the queue 234 from an executing root function writing data to the queue 234 for the consumer root function, which in this example could be a producing root function 238z, writing data for a consuming root function 238k, etc. A consuming root function checks for being in the "pended" state and, if altered to "ready to run" and execution of that consumer occurs, as designated above.

The system heartbeat timer 236 is implemented a timer tick to act as a heartbeat of the scheduler 226. The system heartbeat timer 236 counts down wake-up requests for root functions and, when counted down to zero, places the associated root function into the "ready to run" state.

Wrappers 240 are used for interrupt service routines (ISRs) so that upon an ISR, exiting, the scheduler 226, an IRS is called to effect the execution of any and all root functions of higher priority than that running (if any). As used herein, a wrapper 240 is a wrapper function or a subroutine in a software library or a computer program that calls a method to handle the ISR. Otherwise, the scheduler 226 forces a re-entrant root function scheduling from the highest priority root function that is in the "ready to run" state. The timer tick is wrapped, and any awakened root functions of sufficient priority are executed.

The watchdog timer 228 is provided and is initialized periodically. The watchdog timer 228 expires at a configured period of time specified by the scheduler 226 at building of the scheduler. In the implementation of the Hard, Real Time Operating System (RTOS), a root function of the lowest possible priority is serviced and the watchdog timer 228 is only serviced when that root function is encountered by the scheduler, thus forcing execution of all root functions that are in the "ready to run" state within the time constraints of the watchdog timer 228, which time constraints are determined in the scheduler 226 at build time.

Each root function 238 is configured with a maximum allowed execution time (ta–tc . . . tz) and upon invocation, the maximum allowed execution time of the invoked root function is added to the then current time. The sum of maximum allowed execution time of the invoked root function the then current time are saved with the root function's state and other variable data on the stack 227. That value is adjusted for being preempted (implemented by the method task 232 to request execution of a root function) and ISRs (implemented in their wrappers 240).

The system heartbeat timer 236 checks the active root function, if any, and causes a "kill" by the scheduler 226 of the active root function, if the active root function's configured time is exceeded.

With normal operation, therefore the configuration is such that the watchdog timer 228 never fires. Because of the invocation of the scheduler 226 upon termination of the system heartbeat timer 236 (as well as any other ISR) when prioritized preemption is required, deterministic worst case scheduling is calculable.

Figure 11:
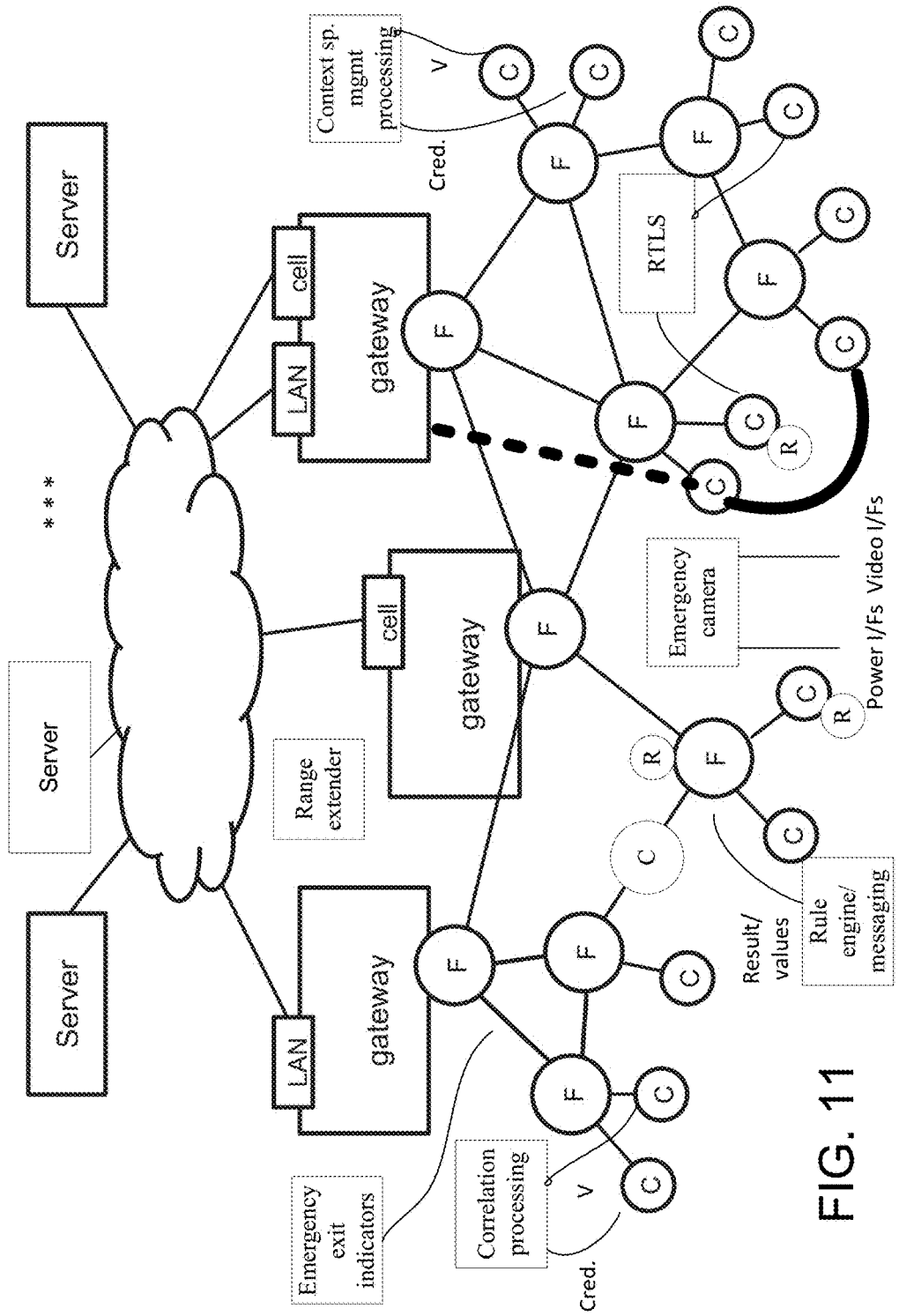
FIG. 11 is a block diagram of components of an networked security system.

FIG. 11 shows an example of a security system having features of the WSN described with respect to FIG. 1 and having the various functionalities described herein. As shown in FIG. 11, correlation processing receives inputs from certain constrained nodes (although these can also be fully functional nodes). These inputs may include credential information and video information, and the correlation processing may produce correlated results that are sent over the network. Context management processing receives inputs from certain constrained nodes (although these can also be fully functional nodes) e.g., credential information and video and grouping information, and performs context processing with results sent over the network. The network supports operation of emergency exit indicators; emergency cameras as well as distributed rule processing and rule engine/messaging processing. Range extenders are used with e.g., gateways, and a real time location system receives inputs from various sensors (e.g., constrained type) as shown. Servers interface to the WSN via a cloud computing configuration and parts of some networks can be run as sub-nets.

The sensors provide in addition to an indication that something is detected in an area within the range of the sensors, detailed additional information that can be used to evaluate what that indication may be without the intrusion detection panel being required to perform extensive analysis of inputs to the particular sensor.

For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces, including the interfaces and the keypad. Other software components suitable for establishing a connection and communicating across network will be apparent to those of ordinary skill.

Program instructions stored in the memory, along with configuration data may control overall operation of the panel.

The monitoring server includes one or more processing devices (e.g., microprocessors), a network interface and a memory (all not illustrated). The monitoring server may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

The invention claimed is:

1. A computer program product tangibly stored on a computer readable hardware storage device, the computer program product for managing constrained computing devices, the computer program product comprising instructions to cause a processor to:
schedule user-defined independently executable root functions that have plural execution status states to execute by the processor from a single stack common to all of the user-defined independently executable root functions according to availability and priority of the user-defined independently executable root functions relative to other user-defined independently executable root functions;
execute an idle root function when none of the user-defined independently executable root functions are executing;
change a state of any of the user-defined independently executable root functions in a first state that is a run in a next pass state to a second state that is a ready to run state, wherein the user-defined independently executable root functions are each configured with a maximum allowed execution time;
service a watchdog timer when the idle root function associated with a lowest possible priority is serviced forcing execution of all of the user-defined independently executable root functions that are in the ready to run state within time constraints of the watchdog timer, wherein the time constraints are determined at a build time;
determine upon invocation of one of the user-defined independently executable root functions a new execution time corresponding to a particular maximum allowed execution time of the one of the user-defined independently executable root functions added to a current time; and
save the new execution time corresponding to the particular maximum allowed execution time of the one of the user-defined independently executable root functions added to the current time with a particular state of the one of the user-defined independently executable root functions on the single stack.

2. The computer program product of claim 1 wherein the computer program product is part of a real-time operating system for execution on a constrained device.

3. The computer program product of claim 1, wherein the instructions further cause the processor to:
  adjust a value corresponding to a sum of the particular maximum allowed execution time of the one of the user-defined independently executable root functions and the current time in response to the one of the user-defined independently executable root functions being preempted.

4. The computer program product of claim 1 further comprising instructions to cause the processor to:
  check a heartbeat timer of an active root function; and
  cause a kill of the active root function when a configured time of the active root function is exceeded.

5. The computer program product of claim 1 wherein the instructions further cause the processor to:
  invoke preemption by an interrupt service routine for a new function; and
  mark a currently running user-defined independently executable function for execution upon return from the interrupt service routine.

6. The computer program product of claim 5 wherein when the new function completes running and returns, the instructions further cause the processor to pop stack usage of the new function and resume running the currently running user-defined independently executable function.

7. A method executed in a computing system that comprises a processor and a memory, the method comprising:
  scheduling by the processor in the computing system, user-defined independently executable root functions that have plural execution status states to execute by the processor from a single stack common to all of the user-defined independently executable root functions according to availability and priority of the user-defined independently executable root functions relative to other user-defined independently executable root functions;
  executing by the processor in the computing system, an idle root function, when none of the user-defined independently executable root functions are executing;
  changing by the processor in the computing system, a state of any of the user-defined independently executable root functions in a first state that is a run in a next pass state to a second state that is a ready to run state, wherein the user-defined independently executable root functions are each configured with a maximum allowed execution time;
  servicing by the processor in the computing system, a watchdog timer when the idle root function associated with a lowest possible priority is serviced forcing execution of all of the user-defined independently executable root functions that are in the ready to run state within time constraints of the watchdog timer, wherein the time constraints are determined at a build time;
  determining by the processor in the computing system, upon invocation of one of the user-defined independently executable root functions, a new execution time corresponding to a particular maximum allowed execution time of the one of the user-defined independently executable root functions added to a current time; and
  saving by the processor in the computing system, the new execution time corresponding to the particular maximum allowed execution time of the one of the user-defined independently executable root functions added to the current time with a particular state of the one of the user-defined independently executable root functions on the single stack.

8. The method of claim 7 wherein the method executes in a real-time operating system environment on a constrained device.

9. The method of claim 7 further comprising:
  invoking by the processor in the computing system, preemption by an interrupt service routine for a new function;
  marking by the processor in the computing system, a currently running user-defined independently executable function for execution upon return from an interrupt; and
  when the new function completes running and returns, popping by the processor in the computing system all stack usage of the new function, and resuming running by the processor in the computing system, the currently running user-defined independently executable function.

10. The method of claim 8, further comprising:
  adjusting by the processor in the computing system, a value corresponding to a sum of the particular maximum allowed execution time of the one of the user-defined independently executable root functions and the current time in response to the one of the user-defined independently executable root functions being preempted.

11. The method of claim 8 further comprising:
  checking by the processor in the computing system, a heartbeat timer of an active root function; and
  causing by the processor in the computing system, a kill of the active root function when a configuration time of the active root function is exceeded.

12. A constrained device comprises:
  a processor device, configured to:
  schedule user-defined independently executable root functions that have plural execution status states to execute by the processor device from a single stack common to all of the user-defined independently executable root functions according to availability and priority of the user-defined independently executable root functions relative to other user-defined independently root executable functions;
  execute an idle root function when none of the user-defined independently executable root functions are executing;
  change a state of any of the user-defined independently executable root functions in a first state that is a run in a next pass state to a second state that is a ready to run state, wherein the user-defined independently executable root functions are each configured with a maximum allowed execution time;
  service a watchdog timer when the idle root function associated with a lowest possible priority is serviced forcing execution of all of the user-defined independently executable root functions that are in the ready to run state within time constraints of the watchdog timer, wherein the time constraints are determined at a build time;
  determine upon invocation of one of the user-defined independently executable root functions a new execution time corresponding to a particular maximum allowed execution time of the one of the user-defined independently executable root functions added to a current time; and
  save the new execution time corresponding to the particular maximum allowed execution time of the one of the user-defined independently executable root functions added to the current time with a particular state of the one of the user-defined independently executable root functions on the single stack.

13. The constrained device of claim 12 further comprising:
   a sensor element for sensing a physical condition, the sensor element sending data for processing to the processor device, with the processor device applying one or more user-defined independently executable functions to the data.

14. The constrained device of claim 12 further comprising:
   a network interface to interface the constrained device to a network.

15. The constrained device of claim 12 further comprising:
   a storage device storing a real-time operating system for execution on the constrained device, with the real-time operating system comprising instructions that configure the processor device.

* * * * *

UNITED STATES PATENT AND TRADEMARK OFFICE
CERTIFICATE OF CORRECTION

PATENT NO. : 10,402,221 B2  
APPLICATION NO. : 15/856223  
DATED : September 3, 2019  
INVENTOR(S) : Vincent J. Lipsio, Jr.

Page 1 of 1

It is certified that error appears in the above-identified patent and that said Letters Patent is hereby corrected as shown below:

In the Drawings

Fig. 8, Sheet 8 of 14, replace "function, 100n" with -- Element 100n --

In the Specification

Column 1, Line 22, replace "memory)." with -- memory. --
Column 2, Line 14, replace "running. preempt" with -- running, preempt --
Column 3, Line 51, replace "DESCRIPTION" with -- BRIEF DESCRIPTION --
Column 3, Line 60, replace "is block" with -- is a block --
Column 3, Line 62, replace "is flow" with -- is a flow --
Column 3, Line 63, replace "is block" with -- is a block --
Column 3, Line 64, replace "is block" with -- is a block --
Column 4, Line 3, replace "is flow" with -- is a flow --
Column 4, Line 4, replace "of an" with -- of a --
Column 5, Line 24, replace "and or" with -- and/or --
Column 13, Line 56, replace "state machine 238a" with -- state machine 239a --
Column 14, Line 27, replace "an then" with -- and then --
Column 14, Line 64, replace "IRS" with -- ISR --

In the Claims

Column 20, Line 14, in Claim 9, replace "function, and" with -- function and --
Column 20, Line 18, in Claim 10, replace "claim 8," with -- claim 7, --
Column 20, Line 26, in Claim 11, replace "claim 8" with -- claim 7, --
Column 20, Line 41, in Claim 12, replace "root executable functions;" with -- executable root functions; --

Signed and Sealed this  
Twenty-sixth Day of November, 2019

Andrei Iancu  
*Director of the United States Patent and Trademark Office*